Dec. 10, 1968  B. ADLER  3,415,590

OPTICAL DISPLAY DEVICE

Filed March 24, 1965  4 Sheets-Sheet 1

INVENTOR
Bertram Adler
BY
Polachek & Saulsbury
ATTORNEYS.

Dec. 10, 1968

B. ADLER 3,415,590

OPTICAL DISPLAY DEVICE

Filed March 24, 1965

INVENTOR
Bertram Adler

BY
Potachek & Saulsbury
ATTORNEYS.

United States Patent Office 3,415,590
Patented Dec. 10, 1968

3,415,590
OPTICAL DISPLAY DEVICE
Bertram Adler, 44A Iozia Terrace,
East Paterson, N.J. 07407
Filed Mar. 24, 1965, Ser. No. 442,272
1 Claim. (Cl. 350—158)

ABSTRACT OF THE DISCLOSURE

An optical display device wherein it is possible to see different images by changing polarized light passing through the images and simultaneously providing color changes. The device embodies polarizing materials and birefringent materials individually or collectively movable with respect to each other for producing changeable colored effects. The materials are carried by rotatable disks.

This invention relates to display devices utilizing polarized light and its effects in association with birefringent materials, and more particularly to devices of such type wherein changeable images and colors are visible to the observer.

An object of the invention is to provide a display device of this character wherein it will be possible for an observer to see different images by changing polarized light passing through the images, and at the same time to provide novel, decorative color changes.

A further object is to provide a novel structure for use in such a device embodying polarizing materials and birefringent materials individually or collectively movable with respect to each other for producing changeable colored effects.

Another object is to provide a changeable image and color display device which may be used for amusement, display or decorative purposes, the device including polarized and birefringent optical disks arranged to produce different optical effects, the disks being quickly replaceable by others to produce other novel optical effects.

For further comprehension of the invention, and of the objects and advantages thereof, reference will be had to the following description and accompanying drawings, and to the appended claim in which the various novel features of the invention are more particularly set forth.

Figure 1:
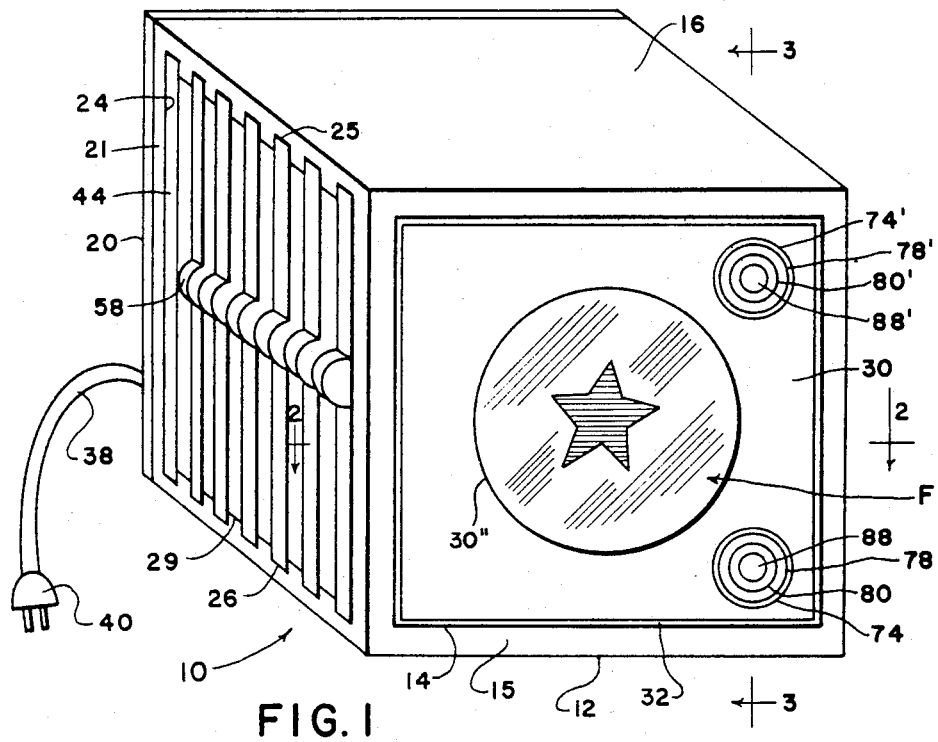
Figure 2:
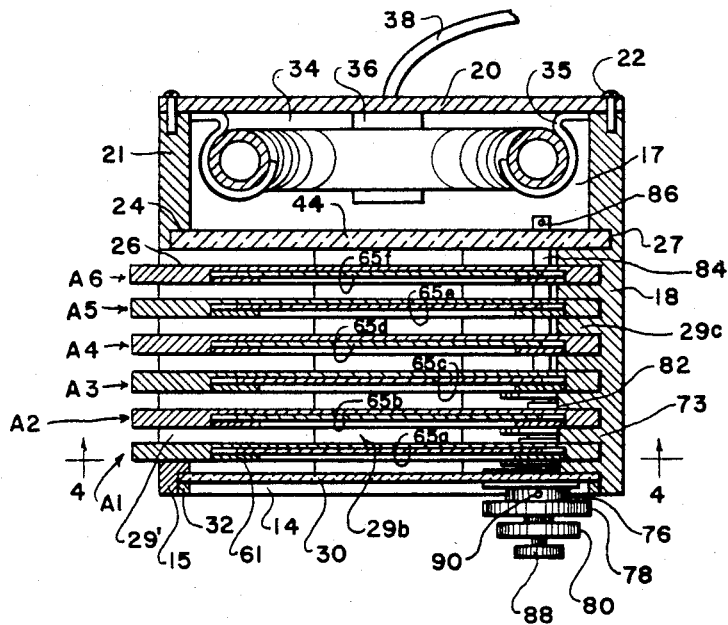
Figure 3:
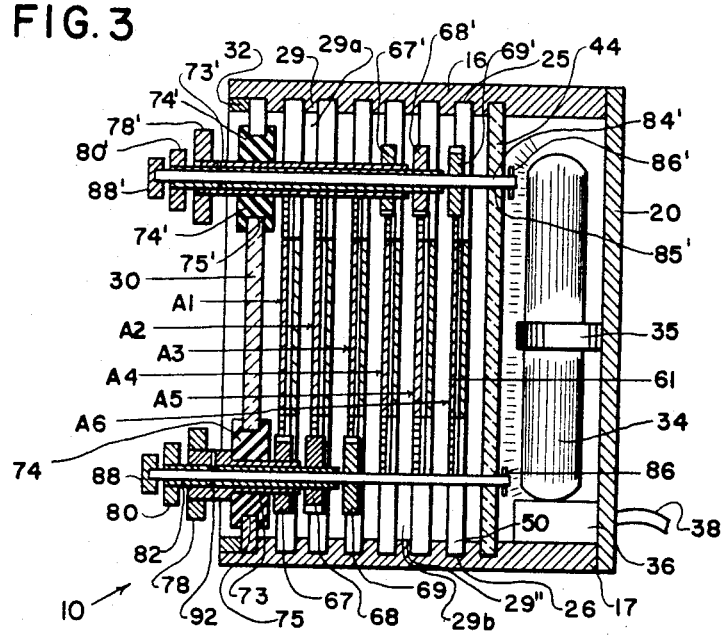
Figure 4:
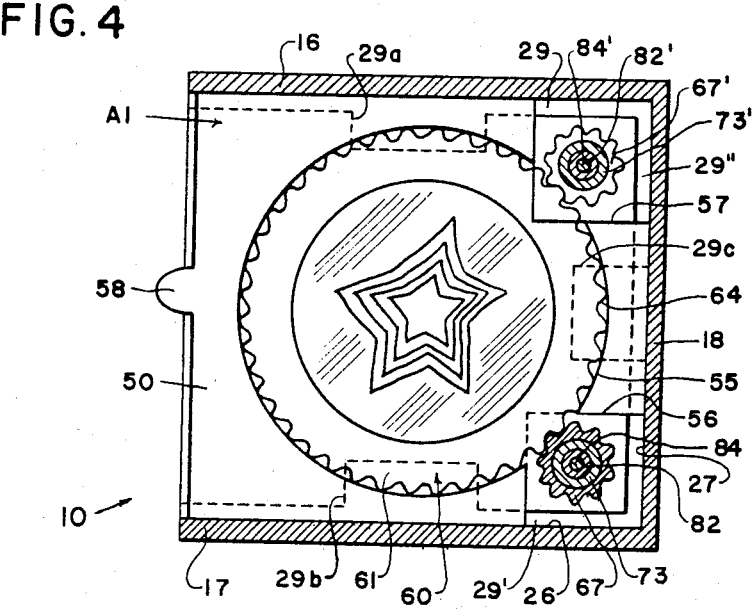
Figure 5:
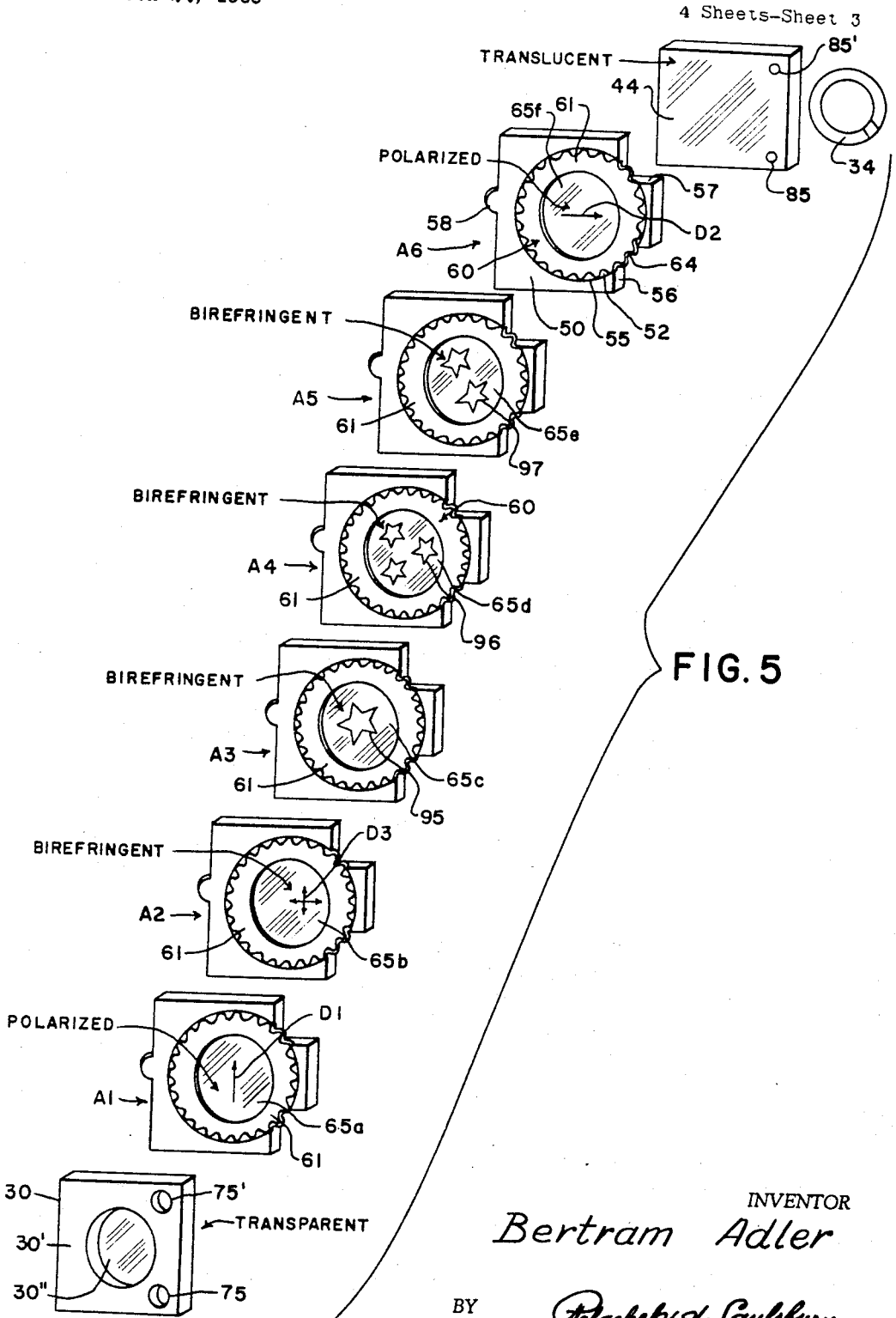
Figure 6:
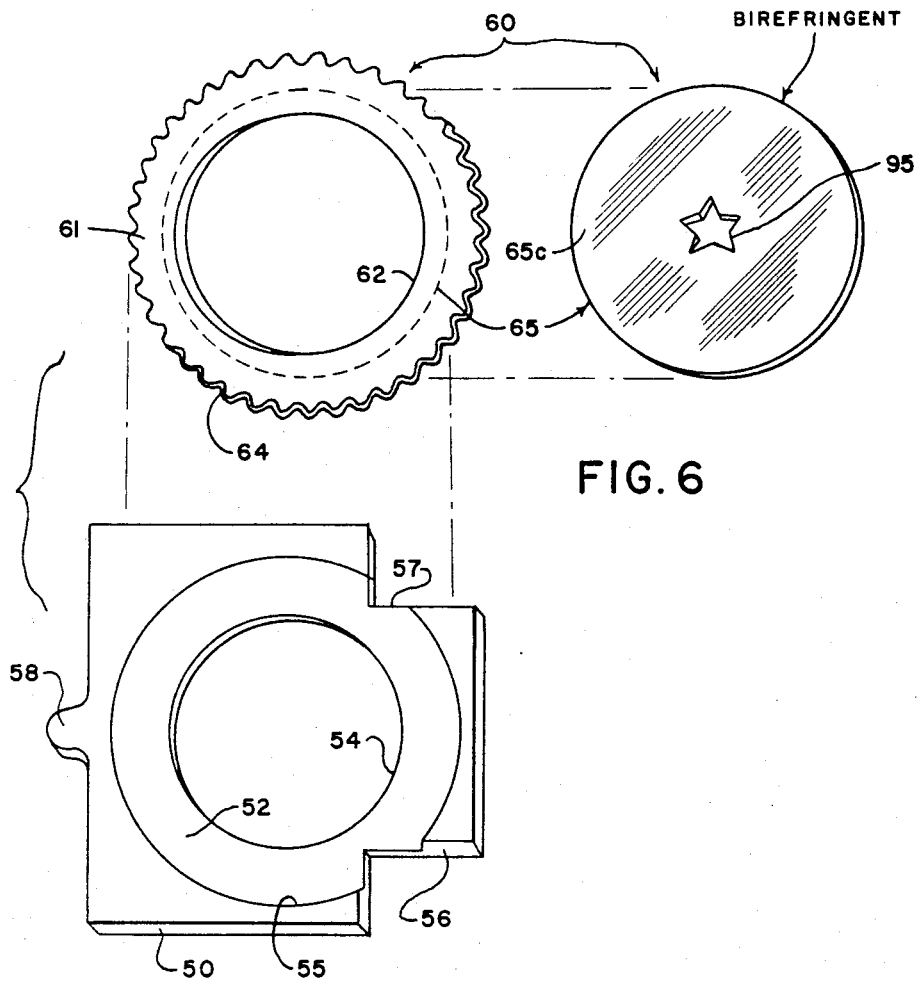

In the accompanying drawings forming a material part of this disclosure:

FIGURE 1 is a perspective view of a display device embodying the invention,

FIG. 2 and FIG. 3 are horizontal and vertical sectional views taken on lines 2—2 and 3—3 respectively of FIG. 1, FIG. 4 is a vertical sectional view taken on line 4—4 of FIG. 2, FIG. 5 is an exploded perspective view on a reduced scale showing components of the device, and FIG. 6 is an exploded oblique plan view of parts of an optical assembly employed in the device.

Referring first to FIGS. 1–4 there is shown the device 10 housed in a framelike casing or cabinet 12 with a rectangular front frame 15 provided with an opening 14. The cabinet has a closed top wall 16, bottom wall 17 and side wall 18. The back of the cabinet is open. A removable back panel 20 held by screws 22 closes the open back. The left side 21 of the cabinet has a rectangular opening 24. In the inner opposing sides of the top and bottom walls are formed parallel grooves 25, 26 extending transversely of these walls. Grooves 25, 26 are continuous with vertical, parallel grooves 27 on the inner side of wall 18. Ridges 29, 29' separate grooves 25, 26 respectively and ridges 29" separate grooves 27. At centers of the ridges are inward projections 29a, 29b and 29c respectively whose purpose is described below.

A transparent glass of plastic plate 30 is mounted in front opening 14 and is held in frame 15 by molding 32. Mounted on the inner side of the back panel 20 is circular fluorescent lamp 34 supported by brackets 35 and socket 36 to which a power cable 38 is connected. The cable terminates in a plug 40 which can be inserted in a suitable power supply receptacle. Instead of a circular lamp, one or more straight tubular lamps may be used, or one or more incandescent lamps may be substituted.

Directly in front of the lamp is a translucent plate 44 which serves as a diffuser for light emitted by lamp 34. The plate 44 may be glass or plastic with a ground surface or it may be made of smoky glass or plastic material. The plate 44 is removably inserted in the cabinet through the side opening 24 and is frictionally engaged in the coplanar grooves 25, 26, 27 closest to lamp 34.

Removably inserted in the other grooves are optical assemblies A1–A6. Each of these assemblies includes a rectangular, flat frame 50, best shown in FIGS. 4–6. The frame 50 has a circular recess 52 formed therein with a central hole 54 disposed inwardly of the narrow rim 55 of the recess. Two rectangular corner cut-outs 56, 57 are formed in the right end of the frame. A tab 58 extends outwardly of the left edge of the frame. An optical disk 60 fits rotatably in recess 52. The disk 60 includes a flat, annular ring 61 which fits flush with the front side of frame 50. Ring 61 has its outer peripheral edge formed with gear teeth 64. A thin circular optical element 65 is secured to one side of the ring concentric with hole 62 in the ring. This element has a diameter less than that of the ring so that the periphery of the element is clear of the teeth 64. The teeth 64 are exposed at the inner corners of the cut-outs 56, 57, for rotational engagement by one of spur gears 67–69 or 67'–69'. Ridge projections 29a, 29b, 29c overlap margins of the rings 61 to hold them rotatably in the frames 50.

Gears 67, 68 and 69 form one axially spaced assembly near the lower right corner of the cabinet. Gear 67 is the most forwardly located gear of the assembly. It is secured to a short sleeve shaft 73 which extends through a rubber grommet 74 anchored in a hole 75 formed near one corner of front plate 30. A front enlargement 76 of the shaft rotationally contacts the front of the grommet 74. On the front end of the shaft 73 is secured a knob 78. A second knob 80 smaller than knob 78 is disposed in front of knob 78 and is secured to the front end of sleeve shaft 82. Shaft 82 extends axially through shaft 73 and is longer than this shaft. Gear 68 is secured near the rear end of shaft 82. A solid shaft 84 extends axially through sleeve shaft 82 and terminates just beyond diffuser plate 44. The rear end of the shaft extends through a hole 85 in the plate and a cross pin 86 engaged in the shaft end prevents forward axial movement of the shaft. On its front end, the shaft 84 carries a small knob 88 for manually turning the shaft. On shaft 84 just rearwardly of the rear end of shaft 82 is gear 69. Each of these gears engages the teeth of a different one of the rings 60 supported rotationally in one of frames 50. Sleeve shaft 73 rotates frictionally in the grommet 74. A pin 90 extends radially through enlargements 76 of shaft 73 and is disposed in a circumferential groove 92 cut in shaft 82. This arrangement prevents separation of the sleeve shafts from each other while permitting relative rotational adjustment.

Sleeve shaft 82 is prevented from moving forwardly off of shaft 84 along with shaft 73 by the presence of front knob 88. It will be noted that the knobs are of progressively larger diameter. By this arrangement, a person operating the device can grasp any one, two or all three of the knobs and can turn them simultaneously. When the knobs are turned, the optical disks 60 in the several optical assemblies A1–A3 are turned through the rotational engagement of the gears 67–69 with the respective rings.

Gears 67', 68', 69' constitute another gear assembly located near the upper right corner of the device, and mounted on shafts 73', 82', 84' and are turned by knobs 78', 80', 88' similar to these already described for the lower gear assembly. Parts associated with gears 67', 68', 69' are identified by primed numbers identical to those assigned to parts associated with gears 67, 68 and 69, and the above description applies.

Sleeve shaft 73' is longer than shaft 73 because the gear 67' carried thereby engages with the toothed ring 60 in the fourth optical assembly A4. Sleeve shaft 82' is longer than shaft 73' and its gear 68' engages the ring of the fifth optical assembly A5. Shaft 84' carries gear 69' engaging the ring of the sixth optical assembly A6. Sleeve shaft 73' passes through grommet 74' and is keyed by pin 90' to shaft 82'. Cross pin 86' is inserted in the rear end of shaft 84' to the rear of upper corner hole 85' in plate 44.

It will be noted that any one or all of the assemblies A1–A6 can be pulled in their planes laterally outward of the cabinet for replacement by other assemblies or for interchanging their relative positions in succession in the cabinet. The optical elements 65a and 65f of the first and sixth optical assemblies A1, A6 are made of transparent material optically polarized in one direction as indicated by arrows D1 and D2 in FIG. 5. This material may be conventional "Polaroid" film such as distributed by Polaroid Corporation of Dover, Delaware.

Optical elements 65b–65e of the second through fifth optical assemblies A2–A5 are made of birefringent material such as cellophane film which is well known to have birefringent optical properties. The crossed arrows D3 of FIG. 5 indicate this property of the film.

It will be noted that the first birefringent element 65b is clear and transparent, and when viewed along exhibits no image or color. Second birefringent element 65c has a central cut-out or aperture 95 and the remainder of the element is clear, transparent and colorless. Third birefringent elements 65d has small cut-outs or apertures 96 and the remainder of the element is clear and colorless. The apertures 95, 96 may have any desired geometrical shapes and may be disposed in the circular films in any desired relative positons. As examples, aperture 95 is a large star and is centrally located, while apertures 96 are smaller stars disposed radially outward of the center of the element 65d and circumferentially spaced apart.

Fourth birefringent element 65e has variously shaped, small optical pieces 97 of cellophane tape secured thereto in spaced positions. These pieces of birefringement material may be clear or colored. They are oriented. Their optical axes are oriented non-uniformly and at random with respect to each other.

With all the optical assemblies A1–A6 installed in the device, and lamp 34 turned on, a spectacular display of differently colored stars and background will appear. By turning either or both knobs 78, 88' to rotate either polarized element 65a or 65f or both with respect to each other, the different colors will increase and decrease in color intensity non-uniformly in a most interesting, entertaining and diverting manner. If any one or more of elements 65b–65e are rotated by selective turning of the knobs 80, 88, 78', 80' the positons of the images of the apertures 95, 96 and optical pieces 97 will change with respect to each other. Furthermore the colors of the apertures, pieces and background of the image field will change. Where parts of any pieces 97 overlaps part or all of any aperture 95, 96 the aperture will appear in multiple colors. Thus as the several optical disks are rotated the images in the circular field F seen at the front of the device change continuously in form and color. The front or rear of plate 30 may have an opaque coating 30' with only central area 30" clear to expose field F.

If desired the birefringent films may be treated in various ways besides those illustrated. For examples they can be made up of interwoven strips, or strips attached together in a grid-like pattern. The birefringent films can be creased, wrinkled or slit in various places. Any particular birefringent film can be treated in several of the ways mentioned with apertures, wrinkling, adhering birefringent pieces, etc.

A particularly advantageous feature of the invention is the quick replaceability and interchangeability of the several optical disks, each consisting of a ring and attached optical film. For merchandising purposes, a display device according to the invention can be provided with a plurality of birefringent disks in addition to the basic four disks. The optical films in the additional disks can be cut or otherwise treated by the user in any desired manner to obtain different optical effects.

The device 10 can be used as a toy or amusement for children or adults, as an ornamental display in a home, office or store, or as an educational appliance to teach optical principles.

If desired, the back panel 20 can be removed along with the lamp 34. In this simplified structure, the user can hold the device in front of any suitable external light source so that the light shines through the exposed rear diffuser plate 44. This will result in optical effects similar to those produced with the internal light source.

While I have illustrated and described the preferred embodiments of the invention, in is to be understood that I do not limit myself to the precise constructions herein disclosed and that various changes and modifications may be made within the scope of the invention as defined in the appended claims.

Having thus described the invention, what I claim as new, and desire to secure by United States Letters Patent is:

1. An optical display device, comprising a rectangular casing having a front opening providing a view into the interior of the casing; a plurality of optical assemblies removably mounted in the casing, each of said assemblies including a frame and a circular optical disk rotatably mounted in a recess in the frame; each optical disk including an annular ring and a flat transparent circular optical element secured across the ring, the optical elements of the disks being disposed parallel to each other with the optical disks being disposed in central axial alignment; means for rotating the optical disks selectively in the frames; the optical elements of two of said disks each being a unidirectional light polarizer, the optical elements of the others of said disks each being birefringent to divide light beams passing therethrough in two different polarization directions; a light diffuser plate mounted near the back of the casing for passing diffused light therethrough to the optical disks; and a light source behind the diffuser plate to illuminate the same; certain ones of the birefringent elements having apertured patterned portions arranged to pass light beams therethrough differently from other portions of certain elements, whereby said patterned portions appear as images having different colors from said other portions when viewed from the front of the casing, and whereby the colors of said images and said other portions change while the optical disks are selectively rotated, said means for rotating the optical disks including gear teeth formed on the peripheries of the rings, said frames having cut-away portions exposing a plurality of teeth of each ring; an assembly of gears in the casing engaged with the exposed teeth of the several rings respectively; shafts carrying the gears; and knobs on the shafts for turning selectively a plurality of said shafts and gears to rotate a selected number of the optical disks simultaneously; said casing having an open side and closed top, bottom and other side, said top and bottom having alternating ridges and grooves therein inside the casing, said frames being seated in said grooves and slidable therein out of and into the casing through said open side, said ridges holding the disks in place in the recesses in the frames.

References Cited

UNITED STATES PATENTS

| | | | |
|---|---|---|---|
| 2,369,457 | 2/1945 | Hanson et al. | 350—148 |
| 2,399,658 | 5/1946 | Banker | 350—159 |
| 2,535,781 | 12/1950 | Buchell | 350—158 |
| 2,763,078 | 9/1956 | Graves | 350—158 |
| 2,977,845 | 4/1961 | Boone. | |

DAVID SCHONBERG, *Primary Examiner.*

P. R. MILLER, *Assistant Examiner.*

U.S. Cl. X.R.

350—148, 157, 159; 40—106.41